(12) United States Patent
Concin et al.

(10) Patent No.: US 12,185,745 B2
(45) Date of Patent: Jan. 7, 2025

(54) METHOD FOR OPERATING A PASTEURIZATION APPARATUS

(71) Applicant: Red Bull GmbH, Fuschl am See (AT)

(72) Inventors: Roland Concin, Fuschl am See (AT); Christian Rinderer, Fuschl am See (AT); Klemens Hans, Eugendorf (AT); Harald Eder, Eugendorf (AT); Philip Thonhauser, Gießhübl (AT); Daniel Herzog, Fuschl am See (AT)

(73) Assignee: RED BULL GMBH, Fuschl am See (AT)

( * ) Notice: Subject to any disclaimer, the term of this patent is extended or adjusted under 35 U.S.C. 154(b) by 459 days.

(21) Appl. No.: 17/595,937

(22) PCT Filed: Jun. 18, 2020

(86) PCT No.: PCT/EP2020/066998
§ 371 (c)(1),
(2) Date: Nov. 29, 2021

(87) PCT Pub. No.: WO2020/254511
PCT Pub. Date: Dec. 24, 2020

(65) Prior Publication Data
US 2022/0225643 A1    Jul. 21, 2022

(30) Foreign Application Priority Data
Jun. 18, 2019 (EP) .................... 19180981

(51) Int. Cl.
*A23L 3/04* (2006.01)
*A23L 2/46* (2006.01)
(Continued)

(52) U.S. Cl.
CPC ............... *A23L 3/04* (2013.01); *A23L 2/46* (2013.01); *A23L 3/362* (2013.01); *C02F 9/00* (2013.01);
(Continued)

(58) Field of Classification Search
CPC .... A23L 3/04; A23L 2/46; A23L 3/362; C02F 9/00; C02F 1/44; C02F 1/50; C02F 1/66;
(Continued)

(56) References Cited

U.S. PATENT DOCUMENTS 8,147,758 B2    4/2012 Leach
2005/0132533 A1    6/2005 Nguyen et al.
(Continued)

FOREIGN PATENT DOCUMENTS

AT    2017228705 A1    4/2018
AU    2017228705 B2    11/2018
(Continued)

OTHER PUBLICATIONS

International Preliminary Report on Patentability for International Patent Application No. PCT/EP2020/066998 dated May 19, 2021, 11 pages.
(Continued)

*Primary Examiner* — Brent T O'Hern
(74) *Attorney, Agent, or Firm* — Stoel Rives LLP

(57) ABSTRACT

The disclosure relates to methods for operating a pasteurizing device for pasteurizing foods filled into sealed containers. The foods are treated in treatment zones by applying a tempered, aqueous treatment liquid to an exterior of the containers. The treatment liquid is re-supplied to at least one treatment zone for reuse via circulation circuit pipes of a circulation circuit. A partial flow of the treatment liquid is continuously removed from the circulation circuit and filtered by means of a membrane filtration means. Furthermore, a biocide is apportioned to the treatment liquid as process chemical, such that a concentration of the biocide does not exceed 0.4 mmol/L. In addition, a pH-regulating agent comprising at least one inorganic or organic acid is apportioned to the treatment liquid as process chemical, (Continued)

such that a pH value of the treatment liquid is set to a range from 3.5 to 7.0.

22 Claims, 1 Drawing Sheet

(51) Int. Cl.
  *A23L 3/36* (2006.01)
  *C02F 9/00* (2023.01)
  *C02F 1/44* (2023.01)
  *C02F 1/50* (2023.01)
  *C02F 1/66* (2023.01)
  *C02F 5/14* (2023.01)

(52) U.S. Cl.
  CPC ............ *C02F 1/44* (2013.01); *C02F 1/50* (2013.01); *C02F 1/66* (2013.01); *C02F 5/14* (2013.01); *C02F 2209/055* (2013.01); *C02F 2209/06* (2013.01); *C02F 2301/043* (2013.01); *C02F 2301/046* (2013.01); *C02F 2303/04* (2013.01); *C02F 2303/20* (2013.01)

(58) Field of Classification Search
  CPC ............ C02F 5/14; C02F 2209/055; C02F 2209/06; C02F 2301/043; C02F 2301/046; C02F 2303/04; C02F 2303/20
  USPC ........................................... 426/407
  See application file for complete search history.

(56) References Cited

U.S. PATENT DOCUMENTS

| | | | |
|---|---|---|---|
| 2007/0138096 A1 | 6/2007 | Tarr et al. | |
| 2013/0098844 A1 | 4/2013 | Forstmeier et al. | |
| 2014/0110360 A1 | 4/2014 | Braun et al. | |
| 2015/0368135 A1 | 12/2015 | Muenzer | |
| 2017/0360069 A1 | 12/2017 | Concin et al. | |
| 2018/0116254 A1* | 5/2018 | Demoulin | A23L 2/78 |
| 2018/0116255 A1 | 5/2018 | Demoulin et al. | |

FOREIGN PATENT DOCUMENTS

| | | |
|---|---|---|
| DE | 102017111791 A1 | 12/2018 |
| EP | 2722089 A1 | 4/2014 |
| EP | 3296031 A1 | 3/2018 |
| EP | 3491934 A1 | 6/2019 |
| JP | 2005021687 A | 1/2005 |
| JP | 2007017056 A | 1/2007 |
| JP | 2007084841 A | 4/2007 |
| JP | 2016193417 A | 11/2016 |
| JP | 2018038942 A | 3/2018 |
| WO | 2011131963 A2 | 10/2011 |
| WO | 2016100996 A1 | 6/2016 |
| WO | 2016100997 A1 | 6/2016 |
| WO | 2018076034 A1 | 5/2018 |
| WO | 2018076035 A1 | 5/2018 |
| WO | 2018162700 A1 | 9/2018 |
| WO | 2019106092 A1 | 6/2019 |

OTHER PUBLICATIONS

International Search Report and Written Opinion for International Patent Application No. PCT/EP2020/066998 dated Jul. 22, 2020, 15 pages.

"Corrosion by Cooling Water and its Prevention Measures", Chemical Industry, 1971, 35(2), pp. 163-166, Japan.

Clarke, et al., USACCHPM, TIP Technical Information Paper #31-007-0306, Chlorine Dioxide Disinfection in the Use of Individual Water Purification Devices (Year: 2006).

PE2E Translation of JP 2018038942, Water Treatment System, Kikuchi et al. (Year: 2018).

USDA, General Specifications for Dairy Plants, accessed at https://www.ams.usda.gov/sites/defau1Ufiles/media/General%20Specifications %20for%20 Dairy%20 Plants %20Approved %20for%20 USDA %20 Inspection %20and%20Grading %20Service. pdf (Year: 2012).

* cited by examiner

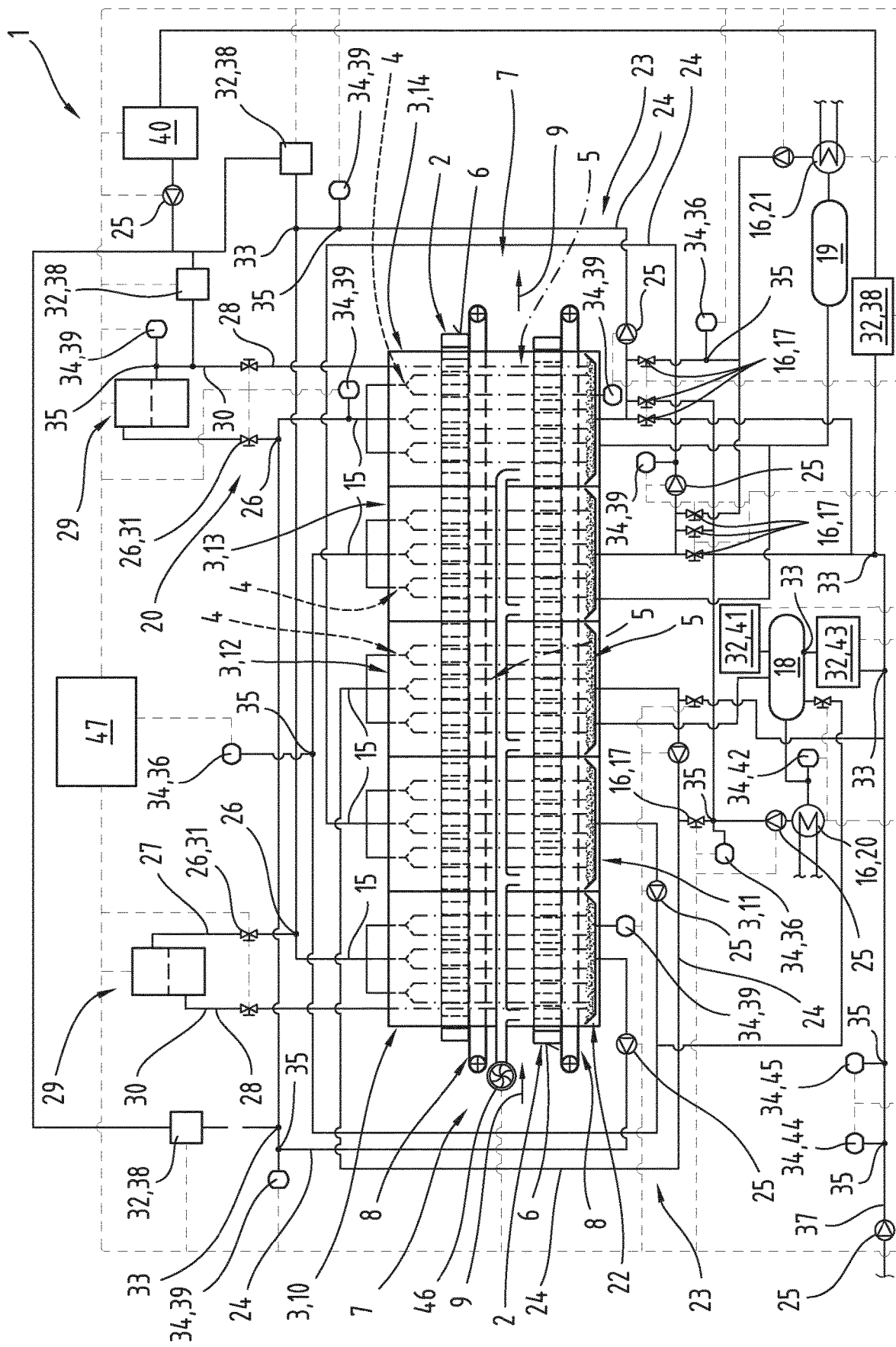

METHOD FOR OPERATING A PASTEURIZATION APPARATUS

RELATED APPLICATIONS

This application is a national stage under 35 U.S.C. § 371 of International Application No. PCT/EP2020/066998, filed Jun. 18, 2020, which claims priority of European Patent Application No. 19180981.3, filed Jun. 18, 2019.

BACKGROUND

The present disclosure relates to a method for operating a pasteurizing device for pasteurizing foods filled into sealed containers.

Pasteurizing is a method primarily for preserving foods by selective tempering of the foods. The foods are usually heated to an elevated temperature level in order to eliminate reproductive, living microorganisms. Often, the foods are filled into containers before pasteurization, the containers are sealed, and a tempered and/or heated treatment liquid is applied to an exterior of the containers for tempering and/or pasteurizing the foods. In this manner, a ready-to-be-stored and/or ready-to-be-sold product can be provisioned.

In such cases, so-called tunnel pasteurizers are mostly used, in which containers which are filled with foods and sealed are run through multiple treatment zones and, in a respective treatment zone, are covered and/or sprayed with a tempered treatment liquid. Widely used are plants in which the foods are first successively heated in zones and then successively cooled down in other zones. Usually, at least a large part of the aqueous treatment liquid used for this purpose is run around the treatment zones in a circuit and continuously reused. This is done, on the one hand, in order to save resources and keep fresh-water use as low as possible. On the other hand, also the energy use required for tempering the treatment liquid can be lowered in this manner.

Naturally, however, it is unavoidable with such a continuous reuse of an aqueous treatment liquid and/or continuous circulation of treatment liquid that contaminants are introduced into the aqueous treatment liquid over time, which leads to progressive soiling and subsequently also to a microbial contamination of the treatment liquid and/or of the treatment water. Sources of the introduction of contaminants and also microorganisms may be, for instance, the ambient air, cooling towers for cooling the treatment liquid as and when required, operating personnel, abraded particles from transport means for the containers, or, for instance, the containers themselves, for example microparticles from prints, labels or stickers, and also the content of the containers, for example in case of a damaging of the containers.

The treatment liquid's propensity for microbial contamination in such pasteurizing devices is a result of the fact that, on the one hand, the circulated and/or perpetually-reused treatment liquid is enriched with nutrients, and, in addition, due to the sprinkling of the good(s) to be pasteurized, is highly aerobized and/or saturated with oxygen. In addition, there are water parameters in such tunnel pasteurizers, at least in some zones of pipes and of the treatment zones, which facilitate a reproduction of the microorganisms, for example due to a favorable temperature level of the process water. This, in turn, leads to a formation of deposits, in particular in the form of so-called biofilms, which can lead to a production stop and maintenance and/or cleaning work with subsequent refilling of the pasteurization plant being required at specific time intervals.

In order to account for this problem and other requirements of the treatment liquid in pasteurizers, in particular hygiene requirements, chemicals for stabilizing the aqueous treatment liquid and/or the process water, as well as for achieving desired process manipulations, are admixed to the treatment liquid in accordance with the prior art. The adding of these chemicals, in this case, is done in a time-controlled and/or volume-controlled manner in accordance with the prior art. Due to the high heat load in such pasteurizing devices, however, there is a high and/or rapid chemical decomposition of such process chemicals. Additionally, a chemical decomposition, and therefore a gradual decline in the concentration of the process chemicals, can also be induced by chemical reactions of the process chemicals with one another or with decomposition products of the process chemicals or other substances dissolved in the treatment liquid. An additional problem arises from the fact that partial quantities of the circulated aqueous treatment liquid are continuously lost from a circulation circuit of such a pasteurizing device, for example due to the sprinkling of the containers filled with foods or due to evaporation, and these partial quantities must be replaced with fresh treatment liquid and/or fresh water. This often necessitates the use of different fresh-water sources, wherein the quality and/or water parameters of fresh waters from different sources can vary greatly. In addition, the supplying of fresh water leads to a dilution of the circulated aqueous treatment liquid.

In order to solve these problems described, such as the chemical decomposition of the process chemicals or varying fresh-water quality, a high and/or even excessive quantity of process chemicals is admixed in accordance with the prior art in order to reliably achieve the desired process effects. In particular, a much higher quantity of process chemicals than would generally be required is added to aqueous treatment liquids, and/or process chemicals are overdosed. This massive use of chemicals, however, is disadvantageous in both economic and ecological respects. Among other things, high costs for the large quantities of chemicals, as well as their storage, occur. In addition, such an excessive use of process chemicals can cause undesired side effects. For example, there may be corrosion of plant components and other undesired reactions, also with the treated containers.

In the past, measures for reducing the use of chemicals for stabilizing a continuously-reused treatment liquid of a pasteurization plant were suggested. Predominantly, measures for cleaning were suggested which primarily aim at removing filterable and/or settleable, particulate substances. Such measures mainly relate to a filtration of large-grain substances, or their isolation by means of gravity-aided sedimentation, such as this is described in EP 2 722 089 A1, for example. Furthermore, measures have also been suggested by means of which also small to smallest-grain substances, including microorganisms, can be removed from a circulated treatment liquid. In this respect, good results can be achieved with the measures suggested in WO 2016/100996 A1, for example.

Nevertheless, in view of the prior art, there continues to be a need for improvement regarding pasteurizing devices and methods for their operation with regard to the purification and sterilizing of a perpetually-reused and/or circulated treatment liquid.

SUMMARY

The inventors have developed a method improved over the prior art for operating a pasteurizing device as well as an improved pasteurizing device by means of which a more efficient stabilizing of a continuously-reused treatment liquid can be achieved with as low a use of chemicals as possible, so that a continuous uninterrupted operation without interruptions for maintenance and/or cleaning for as long a period of time as possible is ensured.

The method for operating a pasteurizing device for pasteurizing foods filled into sealed containers comprises a transporting of containers which are filled with foods and sealed through multiple treatment zones in a transport direction by means of a transport means. The foods are treated in the treatment zones by applying a tempered treatment liquid to an exterior of the containers. Here, treatment liquid with a specific temperature is supplied to each treatment zone via a feed pipe.

This is done in such a way that the foods in the sealed containers are pre-heated, in transport direction, in at least one warm-up zone, heated, following in transport direction, to pasteurizing temperature in at least one pasteurizing zone and cooled down, following in transport direction, in at least one cool-down zone. After application to the containers, the treatment liquid is collected in the treatment zones, and collected treatment liquid is re-supplied to at least one treatment zone for reuse via circulation circuit pipes of a circulation circuit.

Furthermore, a partial quantity of treatment liquid is continuously removed from the treatment liquid circulated in the circulation circuit or from treatment liquid in a treatment zone by means of at least one liquid-removal means for forming at least one partial flow of the treatment liquid. This at least one partial flow is supplied to a membrane filtration means arranged in at least one bypass via a feeding pipe of at the least one bypass and filtered.

Subsequently, the filtered partial flow is be fed back again into the circulation circuit or into a treatment zone. Here, the bypass forms part of the circulation circuit.

In addition, process chemicals are added to the treatment liquid.

In particular, a biocide selected from a group consisting of hypochlorite, peracetic acid, chlorine dioxide and bronopol, or a mixture of biocides selected from this group, is apportioned to the treatment liquid as process chemical. This is done in such a way that a concentration of the biocide, or a total concentration of biocides, does not exceed 0.4 mmol/L. In addition, a pH-regulating agent comprising at least one inorganic or organic acid is apportioned to the treatment liquid as process chemical, such that a pH value of the treatment liquid is set to a range from 3.5 to 7.0.

The specified measures ensure that an efficient method with sufficiently good stabilization of the treatment liquid can be provisioned. In particular, a formation of so-called biofilms can be impeded. Surprisingly, this is true despite the low concentration of biocide in the treatment liquid. Yet it is specifically because of the low concentration of biocide in the treatment liquid and through the selection of one of the specified biocides that also undesired effects which can in particular occur with a high biocide concentration can be impeded. This concerns, among other things, a corrosion of plant parts, or also surface reactions and concomitant discolorations on plant parts or on the treated containers.

A pH value of the treatment liquid in the specified range has proven effective in particular for impeding surface reactions, for example on surfaces of components of the pasteurizing device, but also of the treated containers, and concomitant discolorations. Both in case of a lower and/or too low a pH value and in case of a higher and/or too high a pH value of the treatment liquid, an increased propensity for the formation of corrosion damage and discolorations can be observed. Preferably, a pH value of the treatment liquid can be set to 4.0 to 6.5.

Overall, the specified measures ensure that an improvement of the operating efficiency of a pasteurizing device can be achieved. In particular, a long uninterrupted operation of a pasteurizing device can be enabled, wherein interruptions of the regular pasteurizing operation due to maintenance and/or cleaning operations, for example due to a formation of biofilms and/or deposits in general, can be impeded effectively. The use of the membrane filtration and process chemicals in low concentration has proven effective here in a synergistic manner.

It may in particular be provided in the method that the foods to be pasteurized are filled into containers comprising a metal, in particular aluminum, such as bottles with a seal comprising a metal, for example a screw cap, or the known aluminum drinks cans, for instance.

Specifically in containers comprising a metal, the treatment with a tempered treatment liquid for pasteurizing the foods in the containers can result in discolorations in the container regions comprising metal due to the continued exposure of the containers to the treatment liquid. In the case of aluminum cans, this is known as so-called staining. As it has turned out, the parameters and/or the composition of the aqueous treatment liquid, such as its pH value and chemicals content, for example, play a significant role in this context, and a discoloration of containers comprising a metal, in particular aluminum, can be counteracted by means of a low concentration and suitable choice of process chemicals, and/or such a discoloration can be impeded by means of the treatment with the aqueous treatment liquid.

To the extent that mention is made, here and subsequently, of a concentration of a process chemical, or of a total concentration of process chemicals, this is to be understood to mean an average concentration throughout the entire treatment liquid. In this context, as a person skilled in the field will immediately understand, a concentration of a process chemical, or a total concentration of process chemicals, can be drastically higher in the locally-limited region of a dosing point for the process chemical(s), for the temporally-limited duration of an apportioning and hereafter, than a general average concentration in the treatment liquid. Such unavoidable exceeding of the specified concentrations and/or total concentrations is therefore exempt from the specified values of the concentrations and/or total concentrations, of course. In particular, a concentration of a process chemical, or a total concentration of process chemicals, is to be understood, here and subsequently, as a dynamic average concentration on an average per hour throughout the entire treatment liquid. This applies, here and subsequently, to all specifications referring to a concentration, or total concentration, including specifications of the pH value of the treatment liquid.

It may be provided in a preferred further development of the method that chlorine dioxide is apportioned to the treatment liquid as biocide.

Chlorine dioxide as biocide generally has a number of advantages over alternative biocides, such as high efficiency or low propensity for corrosion, and it is also a biocide that is ecologically useful. Surprisingly, the use of chlorine dioxide as biocide has proven highly effective in the specified pasteurizing method with circulation of a treatment liquid. On the one hand, this is despite the very high temperature level of the circulated treatment liquid in some zones of the treatment zones and of the circulation circuit, which temperatures, in some sections, are considerably higher than the decomposition temperature of chlorine dioxide of approx. 45° C.

Also, chlorine dioxide surprisingly proves excellently effective in the treatment liquid continuously run in the circulation circuit. This is despite the high consumption for which chlorine dioxide is generally known. Surprisingly, chlorine dioxide in the treatment liquid seems possible in the specified method also over sufficiently distant transport routes in the circulation circuit, so that the desired biocidal effect is achievable at least at points of the pasteurizing device which are sensitive with regard to the formation of biofilms.

Here, a target value of the chlorine dioxide concentration can also be specified in a varied and/or variable manner as and when required, for example depending on the contaminant concentration and/or depending, for example, on a detected microbial count in the treatment liquid.

Furthermore, an execution of the method can be applied in which chlorine dioxide is chemically produced in situ and provisioned for (a) dosing means by means of a provisioning means.

This ensures that the provisioning of chlorine dioxide for the dosing means can be done as and when required. Here, the production of the chlorine dioxide can be done by means of methods generally known, for example by means of the hydrochloric acid/chlorite method or the persulfate/chlorite method and/or the peroxosulfate/chlorite method. Particularly preferably, the so-called one-component solid method is used as chlorine dioxide provisioning method, in which the components required for the chemical production of chlorine dioxide are provided in an inertly-compacted form which can be dissolved in water. The latter provisioning method is preferred due to the higher long-term stability of the product and the simple handling, among other things.

Yet quite generally, it may also be provided in the method that a mixture of chlorine dioxide and hypochlorite is apportioned to the treatment liquid as biocide.

Furthermore, an execution of the method may be provided in which the biocide is apportioned to a volume flow of the treatment liquid, which volume flow of the treatment liquid is run in a circulation circuit pipe leading, in terms of flow dynamics, to a cool-down zone.

As has turned out, it is specifically in the region of the cool-down zones that an increased propensity for forming biofilms can be observed. It has turned out that an apportioning of a biocide in the region of a cool-down zone is particularly effective for impeding a formation of biofilms. This is also because a consumption of and/or a loss in biocide due to a long transport route to a cool-down zone can be impeded by such a measure.

Yet it may also be of advantage to apportion the biocide to the treatment liquid at at least one dosing point arranged in the circulation circuit or in a treatment zone, at which dosing point treatment liquid (5) is run at a temperature of 20° C. to 55° C.

This measure ensures, above all, that a sufficiently high concentration of biocide can be provisioned, and also maintained, in the treatment liquid at dosing points and/or dosing sections that are prone particularly to biofilm formation. A possible problem of too high a biocide consumption in the treatment liquid along long transport routes can thus be avoided. Preferably, a biocide can be apportioned to the treatment liquid by means of at least one dosing means at at least one dosing point or at at least one dosing section, at which dosing point or at which dosing section treatment liquid is run at a temperature of 30° C. to 45° C.

It may further be expedient if the biocide is apportioned to the treatment liquid at at least one dosing point arranged in the at least one bypass downstream, in terms of flow dynamics, of a membrane filtration means.

This constitutes a particularly effective measure for the apportioning of biocide, as a biocide is admixed and/or apportioned into an immediately pre-purified treatment liquid with a very low, or practically no, particulate contamination. This, in turn, ensures that a consumption of biocide can be kept very low and a good transport and/or a good dissipation of a biocide in the entire circulated treatment liquid can be achieved.

In another embodiment of the method, at least one actual value of the biocide concentration in the treatment liquid can be detected by means of at least one biocide concentration measurement sensor at at least one measurement point, and, on the basis of the actual value detected at the at least one measurement point, a concentration of the biocide in the treatment liquid can be manipulated, with regard to a specifiable target value for the concentration of the biocide, by apportioning the biocide by means of at least one dosing means at at least one dosing point.

Here, it may in particular be provided that at least one actual value of the biocide concentration is detected at at least one measurement point arranged in the circulation circuit or in a treatment zone, at which measurement point treatment liquid is run at a temperature of 20° C. to 55° C.

The monitoring of the biocide concentration in the treatment liquid at measurement points and/or measurement sections of a pasteurizing device with the specified range for a temperature level of the treatment liquid is advantageous in particular because, at such points, temperature conditions in the treatment liquid are such that a growth and/or a reproduction of microorganisms is generally enabled and/or even facilitated. This is one of the reasons why the formation of biofilms is particularly likely at such points and/or sections. Preferably, it may be provided that at least one actual value of the biocide concentration is detected by means of at least one concentration sensor at at least one measurement point or at at least one measurement section, at which measurement point or at which measurement section treatment liquid is run at a temperature of 30° C. to 45° C.

It may be provided in a further development of the method that a pH-regulating agent comprising at least one acid selected from a group consisting of sulphuric acid, phosphoric acid, formic acid, acetic acid, citric acid, gluconic acid, lactic acid, heptagluconic acid, or a mixture of acids selected from this group, is apportioned to the treatment liquid.

Said acids have in particular proven suitable for impeding discolorations on containers comprising a metal.

Furthermore, it may be useful if the pH-regulating agent is apportioned to the treatment liquid at at least one dosing point, at which dosing point treatment liquid is run at a temperature of 40° C. to 90° C. This is because conditions at such points with a high temperature level are particularly corrosive, and a checking of the pH value at these points is particularly expedient.

It may be provided in another embodiment of the method that at least one complex-forming acid selected from a group consisting of gluconic acid, lactic acid, citric acid, or a mixture of acids selected from this group, is apportioned to the treatment liquid as process chemical(s), such that a concentration of the at least one complex-forming acid, or a total concentration of the apportioned, complex-forming acids, does not exceed 2.2 mmol/L.

Said complex-forming acids are suitable, in this context, for impeding scale formation effectively. The limitation to a maximum concentration of an acid, and/or to a total concentration of multiple of said acids, to 2.2 mmol/L ensures that, on the other hand, undesired side effects can be impeded.

In this context, it may further be of advantage if the at least one complex-forming acid is apportioned to the treatment liquid at at least one dosing point, at which dosing point treatment liquid is run at a temperature of 55° C. to 95° C. This is because, at such points with the specified temperature-level range of the treatment liquid, a sufficient concentration of complex-forming acid, and/or of complex-forming acids, can hereby be provisioned, and in particular scale formation can thereby be impeded.

In a further development of the method, at least one complex-forming phosphonic acid selected from a group consisting of (1-Hydroxy-1,1-ethanediyl)bis(phosphonic acid), 3-Carboxy-3-phosphonohexanedioic acid, Diethylenetriamine pentamethylene phosphonic acid, Aminotris(methylenephosphonic acid), or at least one phosphonate of a phosphonic acid selected from this group, or a mixture of phosphonic acids and/or phosphonates selected from this group, can be apportioned to the treatment liquid as process chemical(s), such that a concentration of the at least one complex-forming phosphonic acid or of the at least one phosphonate, or a total concentration of the apportioned, complex-forming phosphonic acids and/or phosphonates, does not exceed 0.2 mmol/L.

Also said phosphonates and/or their mixtures are generally effective with regard to an impeding of corrosion and scale formation. The selection of the phosphonate, or phosphonates, from the specified group and the limitation to a concentration, or total concentration, of 0.2 mmol/L ensures that, again, undesired side effects caused by excessive concentration of process chemical(s) in the treatment liquid can be impeded.

Also in this case, it may be expedient if the at least one complex-forming phosphonic acid and/or the at least one complex-forming phosphonate is apportioned to the treatment liquid at at least one dosing point, at which dosing point treatment liquid is run at a temperature of 55° C. to 95° C.

Yet it may also be provided that a divalent zinc salt is apportioned to the treatment liquid as process chemical, such that a concentration of the divalent zinc salt does not exceed 0.06 mmol/L.

Also $Zn^{2+}$ salts have proven effective primarily as corrosion inhibitors and can generally be apportioned to the treatment liquid together with other process chemicals and/or corrosion inhibitors.

Furthermore, it may be provided that an oligomer or polymer substance selected from a group consisting of polyphosphates, water-soluble polyacrylates and copolymers of maleic acid and acrylic acid, or a mixture of oligomer or polymer substances selected from this group, is apportioned to the treatment liquid as process chemical, such that a concentration of the apportioned oligomer or polymer substance, or a total concentration of the apportioned oligomer or polymer substances, does not exceed 0.4 mg/L.

These oligomer or polymer substances have equally proven effective in particular with regard to an impeding of scale formation. The respective oligomers and/or polymers can have molecular weights in the range from 4000 g/mol to 15000 g/mol, for example.

In addition, it may be of advantage in the method if a phosphoric ester, or a mixture of phosphoric esters, is apportioned to the treatment liquid as process chemical, such that a concentration of the phosphoric ester, or a total concentration of the phosphoric esters, does not exceed 0.1 g/L.

Phosphoric esters, per se or also in combination with other process chemicals, have, again, proven to be effective corrosion inhibitors.

In the method, the apportioning of process chemicals can, quite generally, be done manually, for example by operating personnel. In this context, it may also be of advantage if a measurement of a concentration of a substance contained and/or dissolved in the treatment liquid, or of a concentration of a process chemical, is carried out. Also such a measurement of a concentration can be carried out manually, for example by operating personnel of the pasteurizing device 1.

Preferably, it can be proceeded such that at least one actual value of a concentration of at least one chemical substance contained in the treatment liquid and/or of at least one process chemical added and/or of at least one internal standard added is detected by means of at least one concentration measurement sensor at at least one measurement point, and, on the basis of the actual value detected by means of the at least one concentration measurement sensor at the at least one measurement point, a concentration of the at least one contained chemical substance and/or of the at least one process chemical added is manipulated, with regard to a specifiable target value for the concentration of the at least one chemical substance contained in the treatment liquid and/or of the at least one process chemical added and/or of the at least one internal standard added, by apportioning at least one process chemical and/or the at least one process chemical added by means of at least one dosing means at at least one dosing point.

In other words, a concentration, in the treatment liquid, of the at least one chemical substance contained in the treatment liquid and/or of the at least one process chemical added can be manipulated, with regard to a target value for the concentration of the at least one chemical substance contained in the treatment liquid and/or of the at least one process chemical added and/or of the at least one internal standard added, by controlling a dosage quantity of at least one process chemical and/or of the at least one process chemical per unit of time by means of the at least one dosing means. In this process, the dosage quantity of a process chemical can be controlled on the basis of a detected actual value of a concentration of a chemical substance contained in the treatment liquid and/or on the basis of a detected actual value of the concentration of the process chemical itself and/or indirectly on the basis of a detected actual value of an internal standard added. It may be provided that, by apportioning a process chemical, a concentration of this process chemical itself is manipulated with regard to a target value for the concentration of this process chemical. Alternatively or additionally, primarily a concentration of one or multiple chemical substance(s) contained in the treatment liquid can be manipulated by apportioning a process chemical.

A chemical substance contained and/or dissolved in the treatment liquid is understood to mean a chemical substance which is, per se, contained in the aqueous treatment liquid and which is not added. Such substances contained in the treatment liquid are in particular introduced into a pasteurizing device by supplying fresh treatment liquid and/or fresh water. In this context, reference is made to $H_3O^+$ ions determining a pH value of the treatment liquid, and alkaline and alkaline earth salts, in particular Ca salts and Mg salts, determining a water hardness of the aqueous treatment liquid, as important examples.

The term process chemical is to be understood to mean a chemical apportioned to the treatment liquid, wherein, by apportioning a respective process chemical, a concentration of the process chemical itself or the concentration of a chemical substance contained in the treatment liquid is manipulated. In case of the apportioning of multiple process chemicals, it may preferably be provided that process chemicals are selected which have as little propensity as possible for chemical reactions with one another. In this context, the process chemicals which have been specified above have proven well-suited. A selection from the above-mentioned process chemicals ensures that a loss of process chemicals and/or a drop in the concentration of process chemicals in the treatment liquid can be impeded.

An internal standard is to be understood to mean, as generally known, a substance which is added to the treatment liquid in a known concentration and/or quantity and whose concentration can be detected accurately, and in particular also with a low limit of detection, by means of respective concentration measurement sensors suited for acquiring such an internal standard. An internal standard can be formed, for example, by a colorant, in particular a fluorescent dye. Reference is made to fluorescein, a rhodamine or preferably 1,3,6,8-Pyrenetetrasulfonic acid, sodium salt (PTSA) as suitable internal standards.

In this context, an addition of an internal standard to the treatment liquid can generally be done separate from the addition of process chemical(s). Preferably, however, an internal standard is admixed to the treatment liquid together with at least one process chemical, and in particular together with a process chemical whose concentration is to be inferred on the basis of the detection of the concentration of the internal standard. In particular, a process chemical and an internal standard can therefore be apportioned to the treatment liquid together by means of one dosing means. Such an added internal standard enables, in particular, a loss in process chemical(s), for example due to the sprinkling of the containers and/or due to evaporation of the treatment liquid, as elaborated above, to be acquired in particular in a pasteurizing zone and by replacement with fresh treatment liquid.

A determination and/or detection of an actual value of the concentration of an internal standard added and/or apportioned to the treatment liquid in known concentration can quite generally be used as a basis for specifying target values for all added and/or apportioned process chemicals, of course. In this case, a loss and/or a drop in the concentration of process chemicals by other effects than the loss in treatment liquid itself cannot be directly acquired. Such other losses in process chemicals can occur, for example, due to chemical reactions of the process chemicals with chemical substances contained and/or dissolved in the treatment liquid, or also with one another, or, in case of an apportioned biocide, for example due to destruction of microorganisms. Therefore, in case of the detection of a concentration of an added and/or apportioned internal standard as a basis for the apportioning of at least one process chemical, it may be provided that a target value for the concentration of at least one process chemical is increased, on the basis of the detected actual value of the concentration of the internal standard, by means of a correction factor, and the apportioning of the at least one process chemical is done with regard to this specified target value for the process chemical increased by means of a correction factor. In this context, the increase of the target value for a concentration of at least one process chemical is to be understood to mean that such an increase and/or the correction factor is a correction in comparison with the target value which would be the calculated result of the actually-detected actual value of the concentration of the internal standard. In other words, it may be provided in case of a detection of an actual value of a concentration of an internal standard as a basis for the specification of a target value that, due to the excessive increase and/or the correction factor for the target value, at least one process chemical is accordingly apportioned in a larger quantity than would result from the actually-detected actual value of the concentration of the internal standard.

Independently, the at least one actual value of a concentration detected by means of the at least one concentration measurement sensor can, quite generally, serve as a measurement basis and/or measurement reference for the control of the quantitatively variable apportioning of the process chemical(s). In case of a detection of a lower actual value of a concentration of a process chemical and/or of a chemical substance contained in the treatment liquid and/or of an internal standard added than the respective specified target value of the concentration, the dosage quantity, i.e. the quantity of process chemical(s) apportioned to the treatment liquid per unit of time, can be increased. Conversely, in case of a detection of an actual value which is higher than a respective specified target value of the concentration, the dosage quantity of process chemical(s) per unit of time can be reduced, or, at least temporarily, stopped altogether. The apportioning of the process chemical(s) can be done, for example, by supplying and/or volumetrically apportioning a concentrated, aqueous solution of the process chemical(s) into the treatment liquid. A detection and/or definition of the dosage quantity(s) of the process chemical(s) required for achieving a specified target value can be carried out in a manner generally known for each apportioned process chemical by means of stoichiometric calculations and/or in advance experimentally by means of laboratory tests or tests on a pasteurizing device, for example.

All calculating operations required for controlling the apportioning of the process chemical(s) can be mapped in a manner generally known in a control means and/or a computer-implemented program of a control means. To that end, such a control means can be connected, in terms of signal engineering, to the at least one concentration measurement sensor and, for the purpose of controlling, to the at least one dosing means. A control of a dosage quantity of process chemical(s) can be done, as generally known, by means of a controllable dosing valve, for example. Yet quite generally, as mentioned above, also a manual regulation of the dosage quantities of one or multiple process chemical(s) can be done.

Depending, among other things, on the size and design of a pasteurizing device, it may generally be sufficient if an actual value for the concentration of the at least one chemical substance contained in the treatment liquid and/or of the at least one process chemical added and/or of the at least one internal standard added is detected at only one measurement point and/or one measurement section. Equally, it may, quite generally, be useful and sufficient if the at least one process chemical is apportioned to the treatment liquid at only one dosing point and/or one dosing section. Yet it may also be expedient to detect multiple actual values of the concentration of the at least one chemical substance contained in the treatment liquid and/or of the at least one process chemical added and/or of the at least one internal standard added at multiple measurement points and/or multiple measurement sections, wherein the detected actual values, by their very nature, may evidently also vary. For example, it may be provided that at least one actual value of the concentration of the at least one chemical substance contained in the treatment liquid and/or of the at least one process chemical added and/or of the at least one internal standard added is detected at at least one measurement point arranged in the circulation circuit or in a treatment zone. Yet it may also be expedient that at least one actual value of the concentration of the at least one chemical substance contained in the treatment liquid and/or of the at least one process chemical added and/or of the at least one internal standard added is detected at at least one measurement point arranged in a feed pipe for fresh treatment liquid.

Naturally, it may be equally useful to apportion the at least one process chemical to the treatment liquid by means of one or multiple dosing means at multiple dosing points and/or dosing sections. Generally, it may be provided, for example, that at least one process chemical is apportioned by means of at least one dosing means at at least one dosing point arranged in the circulation circuit or in a treatment zone. Yet it may also be expedient that at least one process chemical is apportioned to the treatment liquid at at least one dosing point arranged in a feed pipe for fresh treatment liquid.

Quite generally, a specification of one or multiple target value(s) for a concentration of the at least one chemical substance contained in the treatment liquid and/or of at least one process chemical added and/or of the at least one internal standard added can, of course, be done in a variable manner on the basis of one or multiple actual value(s). Furthermore, it is also absolutely possible to specify different target values for the concentration of the at least one chemical substance contained in the treatment liquid and/or of at least one process chemical added and/or of the at least one internal standard added for different measurement points and/or measurement sections. This applies in particular with respect to the parameters varying greatly from zone to zone in a pasteurizing device, in particular different temperatures of the treatment liquid. Examples of advantageous executions of the method will be described in more detail below.

Evidently, also multiple process chemicals can be apportioned to the treatment liquid at multiple dosing points, and multiple actual values of concentrations of multiple chemical substances contained in the treatment liquid and/or multiple process chemicals can be detected. A controlled apportioning of multiple process chemicals can subsequently be done on the basis of a respectively detected actual value.

Quite generally, a process chemical can, furthermore, comprise multiple chemical substances and/or components, and individual substances of process chemicals may be expedient also with regard to multiple effects.

The detection of at least one actual value of a concentration ensures that the apportioning of the process chemical(s) can be done selectively such that an improved stabilization is enabled even with as low a quantity as possible of an apportioned process chemical and/or apportioned process chemicals. In addition, the specified measures ensure that an undesired and disadvantageous overdosing of process chemicals can be impeded.

For instance, it may be advantageous if at least one actual value of a pH value of the treatment liquid is detected by means of at least one pH measurement sensor at at least one measurement point. Subsequently, a selective apportioning of the pH-regulating agent in the required dosage quantity, with regard to a specifiable target value for the pH value of the treatment liquid, can then be done.

In particular, it may be expedient in this context that the at least one actual value of a pH value of the treatment liquid (5) is detected at at least one measurement point (35), at which measurement point (35) treatment liquid is run at a temperature of 55° C. to 95° C.

Furthermore, it may be provided that an actual value of a water hardness of the treatment liquid is detected by means of at least one $Ca^{2+}$ and/or $Mg^{2+}$ measurement sensor at at least one measurement point. A selective apportioning of process chemicals which are effective as scale prevention agents, such as complex-forming acids or phosphonates, can then be done, again, selectively in a suitable quantity. Sensors for detecting a $Ca^{2+}$ and/or $Mg^{2+}$ concentration may in particular comprise ion-selective electrodes.

In particular, it may be useful here if an actual value of a water hardness of the treatment liquid is detected by means of at least one $Ca^{2+}$ and/or $Mg^{2+}$ measurement sensor at at least one measurement point arranged in a feed pipe for fresh treatment liquid.

Yet it may also be provided that an actual value of a conductivity of supplied, fresh treatment liquid is detected at at least one measurement point arranged in a feed pipe for fresh treatment liquid. Subsequently, a target value for the concentration of at least one process chemical can then be specified, at least in part or for the most part, on the basis of the detected conductivity of the supplied, fresh treatment liquid, and/or a dosage quantity of at least one process chemical can be adjusted with regard to a specifiable target value for the concentration of one or multiple chemical substance(s) contained in the treatment liquid.

Generally, the conductivity of the fresh treatment liquid can be detected manually by sample-taking at the measurement point and subsequent laboratory measurement. Preferably, it may be provided that the conductivity is detected by means of a concentration measurement sensor which is configured as a conductivity sensor. Here, the detection of the conductivity of the fresh treatment liquid is representative of the total concentration of dissolved ions in the freshly supplied treatment liquid. The specified measures ensure in particular that a varying quality and/or composition of the supplied, fresh treatment liquid can be responded to. Subsequently, these measures ensure that the apportioning of the process chemical(s) is done selectively and, at least in part or even for the most part, depending on the supplied fresh treatment liquid and/or the chemical and/or ionic substances contained and/or dissolved therein.

Quite generally, it may be provided that a first actual value and a second actual value of the concentration of at least one contained chemical substance and/or of at least one process chemical added and/or of at least one internal standard added is detected in the treatment liquid by means of a first concentration measurement sensor and by means of a second concentration measurement sensor at at least two measurement points spaced apart from one another, and, on the basis of the actual value detected by means of the first concentration measurement sensor and/or on the basis of the actual value detected by means of the second concentration measurement sensor, a concentration of the at least one contained chemical substance and/or of at least one process chemical added is manipulated, with regard to a specifiable target value for the concentration of the at least one chemical substance contained in the treatment liquid and/or of at least one process chemical added and/or of the at least one internal standard added.

This measure has proven particularly advantageous in large pasteurizing devices with a high pasteurizing capacity and long transport routes of the treatment liquid. In particular, these specified measures ensure that a decrease of the concentration of a substance contained in the treatment liquid and/or of a process chemical and/or of an internal standard can be monitored efficiently along distant transport routes, and the apportioning of the process chemical(s) can be adjusted respectively as and when needed. Here, multiple detected actual values, or respectively only one of the detected actual values, can be used for controlling the apportioning of the process chemical(s).

For example, it may be provided that the first actual value is detected by means of a first concentration measurement sensor arranged adjacent to a dosing means upstream in relation to a flow direction of the treatment liquid, and the second actual value is detected by means of a second concentration measurement sensor arranged spaced at least 5 meters apart from the first concentration measurement sensor upstream in relation to a flow direction of the treatment liquid.

An apportioning of one or multiple process chemical(s) can hereafter be carried out on the basis of a weighting of the two detected actual values, for example. For example, the actual value detected by means of the second sensor can be detected at a measurement point with a high proneness of the pasteurizing device to biofilm forming or corrosion. In such a case, a weighting of 90%, for example, may be assigned to this second actual value, and the actual value detected by means of the first sensor may be weighted at only 10%, for example.

In a further development of the method, it may also be provided that, upon a detected exceeding of a specified target value of the concentration of an apportioned process chemical, in particular an apportioned biocide, gas atmosphere is exhausted from the treatment zones by means of an exhaust means operatively connected with the treatment zones. This can be useful in particular for preventing a leakage of biocide from the pasteurizing device into the environment, in particular in case of treatment zones which are not completely separated from the ambient air. This measure may be expedient in particular in case of an incident in which no circulation of the treatment liquid takes place in the circulation circuit.

BRIEF DESCRIPTION OF THE DRAWING

For the purpose of better understanding of the invention, it will be elucidated in more detail by means of the FIGURE below.

This shows in a respectively very simplified schematic representation:

FIG. 1 a schematic representation of an exemplary embodiment of a pasteurizing plant.

DETAILED DESCRIPTION OF EXEMPLARY EMBODIMENTS

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted FIGURE, and in case of a change of position, these specifications of location are to be analogously transferred to the new position.

FIG. 1 schematically represents an exemplary embodiment of a pasteurizing device 1 for pasteurizing foods filled into sealed containers 2. The pasteurizing device 1 comprises multiple treatment zones 3 with sprinkling means 4 for applying a treatment liquid 5 to an exterior 6 of the sealed containers 2. In the exemplary embodiment in accordance with FIG. 1, purely by way of example and for better clarity, merely five treatment zones 3 are represented, wherein it should be understood that, depending on the requirement and design of a pasteurizing device 1, also fewer or more treatment zones 3 can be provided. For example, pasteurizing devices with 10, 15 or more treatment zones 3 are absolutely customary.

During operation of the pasteurizing device 1, a pasteurizing of foods is carried out such that the foods are filled into the containers 2 in advance, and the containers 2 are sealed. A treatment of the containers 2 which are filled with foods and sealed is carried out in a respective treatment zone 3 by applying an aqueous treatment liquid 5 to an exterior 6 of the containers 2 via the sprinkling means 4. The sprinkling means 4 of a respective treatment zone 3 can be formed by sprinkler or nozzle-type sprinkling means, for example, and/or generally by means for dissipating the treatment liquid in a respective treatment zone 3. The tempered, aqueous treatment liquid 5 is applied to the exterior 6 of the containers 2 in this manner, whereby the containers 2, and therefore the foods filled into the containers 2, can be selectively tempered and pasteurized. The containers 2 can be formed, for example, by bottles, cans or other containers and generally be composed from various materials, and optionally be coated or printed. It may in particular be provided in the method that the foods to be pasteurized are filled into containers 2 comprising a metal, in particular aluminum, such as bottles with a seal comprising a metal. In particular, the containers 2 can be formed by aluminum drink cans 2, such as this is also indicated in FIG. 1.

A transport means 7 for transporting the containers 2 through the treatment zones 3 is provided. In the exemplary embodiment represented in FIG. 1, the transport means 7 comprises two driven conveyor belts 8, with the help of which the containers 2 which are filled with foods and sealed are transported through the treatment zones 3 on two levels during operation of the pasteurizing device 1. This may be done in a transport direction 9, for example from left to right, illustrated by means of the arrows in FIG. 1.

During operation of a pasteurizing device 1, it may be provided, for example, that the foods in the containers 2 are initially warmed up in a treatment zone 3 or in multiple treatment zones 3, heated to, and maintained at, pasteurizing temperature, following in transport direction 8, in one or multiple treatment zones 3 and subsequently selectively cooled down, following in transport direction 9, in one or multiple treatment zones 3.

In the exemplary embodiment of a pasteurizing device 1 represented in FIG. 1, viewed in transport direction 9, initially two treatment zones 3 configured as a warm-up zones 10, 11 are provided by way of example, in which two treatment zones 3 the foods and/or containers 2 are initially successively pre-heated during operation of the device 1. In the represented exemplary embodiment, a pasteurizing zone 12 for pasteurizing the foods is provided in transport direction 9 toward the warm-up zones 10, 11. In this treatment and/or pasteurizing zone 3, 12, the foods are pasteurized by supplying a treatment liquid 5 suitably tempered for pasteurizing and by sprinkling onto the exterior 6 of the containers 2. Following this in transport direction 9, in the exemplary embodiment in FIG. 1, two treatment zones 3 configured as cool-down zones 13, 14 are provided, in which cool-down zones 13, 14 the foods and/or the containers are successively cooled down by supplying a treatment liquid 5 with a temperature respectively suited to cool down the containers 2, during operation of the pasteurizing device 1.

As can be seen from FIG. 1, the pasteurizing device 1 comprises a feed pipe 15 for each treatment zone 3 for feeding a tempered volume flow of the treatment liquid to a respective sprinkling means 4. Furthermore, the pasteurizing device 1 comprises tempering means 16 for tempering the treatment liquid 5 and/or for tempering individual volume flows of the treatment liquid 5 supplied to the treatment zones 3. In the exemplary embodiment represented in FIG. 1, valves 17, in particular flow control valves, for example, are provided as tempering means 16, via which hot treatment liquid from a warm-water tank 18 or cool treatment liquid from a cold-water tank 19 can respectively be admixed, for tempering, to some of the volume flows of the treatment liquid 5 supplied to a treatment zone 3. In addition, as represented in FIG. 1, a heating means 20, for example a heat exchanger such as a hot-steam heat exchanger, can be provided as a general tempering means 16 for warming up and/or heating the treatment liquid. Equally, a cooling means 21, for example a cold-water heat exchanger, can be provided for the general cooling down of the treatment liquid 5. During operation of the pasteurizing device 1, treatment liquid 5 with a specific temperature can be supplied to each treatment zone 3 by means of such tempering means 16 via the respective feed pipe 15.

During operation of the pasteurizing device 1 represented in FIG. 1 as an exemplary embodiment, treatment liquid 5 with a temperature of 25° C. to 45° C., for example, can be supplied to the warm-up zone 10 arranged first in transport direction 9. Treatment liquid 5 with a temperature level of 45° C. to 65° C., for example, can be supplied, following in transport direction 9, to the warm-up zone 11. Treatment liquid 5 with a temperature of 65° C. to 95° C. can be supplied to the pasteurizing zone 12. Treatment liquid with a temperature of 40 to 60° C., for example, can be supplied to the cool-down zone 13 arranged downstream of the pasteurizing zone 12 in transport direction 9 and treatment liquid with a temperature level of 25 to 40° C. can be supplied to the cool-down zone 14 arranged following same in transport direction 9. Depending on different configurations of a pasteurizing device, such as the number of treatment zones, or also depending on the type of a food and/or its requirements, also other temperatures can be selected for the treatment zones 3, of course.

The pasteurizing device 1 represented in FIG. 1 comprises collection elements 22 in each treatment zone 3, such as collection tubs arranged in a bottom base region of the treatment zones 3, for collecting the treatment liquid 5 after its application to the containers 2. Furthermore, a circulation circuit 23 with circulation circuit pipes 24 and conveying means 25 is provided in the treatment zones 3 for reuse of the treatment liquid 5 by re-supplying the collected treatment liquid 5. The circulation circuit pipes 24 can be formed by pipes and the conveying means 25 by conveying pumps. During operation of the pasteurizing device 1, these are used to collect the treatment liquid 5 in the treatment zones 3 after application to the containers 2, and the collected treatment liquid 5 is re-supplied to at least one treatment zone 3 for reuse via circulation circuit pipes 24 of a circulation circuit 23.

In the exemplary embodiment represented in FIG. 1, the circulation circuit 23 is configured such that the treatment liquid of the pasteurizing zone 12 can be fed back again into the pasteurizing zone 12 in a circle. The treatment liquid 5 collected in the cool-down zones 13 and/or 14 can be supplied to the warm-up zones 11 and/or 10 during operation of the pasteurizing device 1 via circulation circuit pipes 24 and/or recuperation pipes. Conversely, as can be seen from FIG. 1, the treatment liquid collected in the warm-up zones 10 and/or 11 can be supplied to the cool-down zones 14 and/or 13 via circulation circuit pipes 24 and/or recuperation pipes. It is advantageous here that, due to the cooling down of the treatment liquid 5 by the pre-heating of the containers 2 in the warm-up zones 11, 12, the collected treatment liquid 5 has a temperature level respectively suited for the cool-down zones 13 and/or 14. Conversely, this also applies to the treatment liquid 5 warmed up by the cooling down in the cool-down zones 13 and/or 14 with regard to the zones 12 and/or 11. Yet partial quantities of the treatment liquid 5 collected in the treatment zones 3 can also be supplied to the water tanks 18, 19 and be replaced with treatment liquid from these water tanks 18, 19. This can serve in particular to manipulate a respective temperature of the treatment liquid 5 for feeding into the treatment zones 3 via the feed pipes 15.

Evidently, a circulation circuit 23 of a pasteurizing device 1 may also be configured differently in detail than in the exemplary embodiment represented in FIG. 1. For example, circulation circuit pipes 24 leading from one treatment zone 3 to another treatment zone 3 may not be provided, but instead, for example, a circulation around individual zones 3, or a circulation via treatment liquid collection tanks. Quite generally, the invention is not limited to specific circulation circuit routings and/or configurations but can be used in any kind of configuration of a circulation circuit 23.

As can be seen from FIG. 1, the pasteurizing device 1 comprises at least one liquid-removal means 26 for continuously removing a partial quantity of treatment liquid 5 from the circulation circuit 23 or from a treatment zone 3. This liquid-removal means 26 is connected, in terms of flow dynamics, with a feeding pipe 27 of at least one bypass 28.

Furthermore, a membrane filtration means 29 arranged in the bypass 28 is configured, wherein the feeding pipe 27 of the at least one bypass 28 is provided for supplying a removed partial flow of the treatment liquid 5 to the membrane filtration means 29 arranged in the at least one bypass 28. A discharge pipe 30 of the at least one bypass 28, which discharge pipe 30 is connected with the circulation circuit 23 or with a treatment zone 3, for re-supplying a filtered partial flow of the treatment liquid 5 into a treatment zone 3 and/or into the circulation circuit 23 is equally provided, as can be seen from FIG. 1.

During operation of the pasteurizing device 1, a partial quantity of treatment liquid 5 is continuously removed, by means of a liquid-removal means 26, from the treatment liquid 5 circulated in the circulation circuit 23 or from treatment liquid 5 in a treatment zone 3 for forming at least one partial flow of the treatment liquid 5, and this at least one partial flow is supplied and filtered via the feeding pipe 27 of at least one bypass 28 of a membrane filtration means 29 arranged in the at least one bypass 28. Subsequently, a partial flow thus purified is fed back again into the circulation circuit 23 or into a treatment zone 3.

Quite generally, a removal of a partial quantity of treatment liquid for supplying to a membrane filtration means 29 can be done at any point of the circulation circuit 23. Equally, a removal from a treatment zone 3, or also from a water tank 18, 19 integrated in the circulation circuit 23, is possible. Preferably, as also represented in FIG. 1, a partial quantity for forming the partial flow of the treatment liquid 5 is removed from the circulation circuit 23, as this renders obsolete an additional pump for removing the partial quantity of the treatment liquid. A liquid-removal means 26 may comprise, for example, a T-piece arranged in the circulation circuit 23 for separation of the liquid flow. Additionally, for controlling the continuously-removed partial quantity of treatment liquid per unit of time, a removal means 26 can additionally comprise a flow control valve 31, for example, such as this is equally illustrated in FIG. 1. Preferably, treatment liquid 5 with a temperature of 50° C. or less is removed for forming and routing via a bypass 28.

In the exemplary embodiment represented in FIG. 1, for example, treatment liquid is removed at two points and supplied to 2 bypasses 28. A respective feeding pipe 27 of the bypasses 28 is connected, in the represented exemplary embodiment, with a circulation circuit pipe 24 leading to the warm-up zone 10 arranged first in transport direction 9, and/or with a cool-down zone 14 leading to the circulation circuit pipe 24 arranged last in transport direction 9. During operation of the pasteurizing device 1, treatment liquid 5 with a relatively low temperature is run in these two circulation circuit pipes 24. As further from FIG. 1, a filtered partial flow of the treatment liquid is preferably fed back again into a treatment zone 3, which treatment zone 3 contains treatment liquid 5 with a temperature level which corresponds, at least essentially, to the temperature of the fed-back partial flow of the treatment liquid. Evidently, depending on a size of a pasteurizing device, or depending on a respective contamination level of the treatment liquid, also only one bypass, or also more than two bypasses, can be provided for the continuous purification of a partial quantity of the circulated and perpetually-reused treatment liquid.

It is further provided in the method for operating a pasteurizing device 1 that process chemicals are added to the treatment liquid 5. Here, an addition of process chemicals can, quite generally, preferably be done in the form of concentrated, aqueous solutions.

Specifically, it is provided that a biocide selected from a group consisting of hypochlorite, peracetic acid, chlorine dioxide and bronopol, or a mixture of biocides selected from this group, is apportioned to the treatment liquid as process chemical, such that a concentration of the biocide, or a total concentration of biocides, does not exceed 0.4 mmol/L. In a preferred variant embodiment of the method, preferably chlorine dioxide can be apportioned to the treatment liquid 5 as biocide. Yet it may also be provided that a mixture of chlorine dioxide and hypochlorite is apportioned to the treatment liquid 5.

Furthermore, it is provided that a pH-regulating agent comprising at least one inorganic or organic acid is apportioned to the treatment liquid as process chemical, such that a pH value of the treatment liquid is set to a range from 3.5 to 7.0, preferably 4.0 to 6.5.

In the method, the apportioning of process chemicals can, quite generally, be done manually, for example by operating personnel. Preferably, an apportioning of one or multiple, or also all, process chemicals added can be done by means of dosing means 32, in particular controlled in an automated manner. As is represented in FIG. 1 and will be explained in more detail on the basis of examples, a process chemical can generally be apportioned to the treatment liquid 5 by means of one or multiple dosing means(s) 32 at one or multiple dosing points 33.

In principle, an apportioning of process chemicals can be done in a time-controlled manner, for example on the basis of empirical values. Yet preferably, it may be provided in the method that an apportioning of at least one or multiple or all process chemical(s) is carried out on the basis of a measurement value of a water parameter, in particular a concentration of one or multiple substances in the treatment liquid. Here, an apportioning of a process chemical can be done on the basis of a measured concentration of the process chemical itself and/or also on the basis of a measured concentration of a different substance contained and/or dissolved in the treatment liquid 5. Quite generally, a measurement of a concentration of a substance contained and/or dissolved in the treatment liquid or a concentration of a process chemical can, again, be carried out manually here, for example by operating personnel of the pasteurizing device 1.

Yet in particular, as represented in FIG. 1, it may preferably be provided that at least one actual value of a concentration of at least one chemical substance contained in the treatment liquid 5 and/or of at least one process chemical added and/or of at least one internal standard added is detected by means of at least one concentration measurement sensor 34 at at least one measurement point 35 and/or measurement section 35, and, on the basis of the actual value detected by means of the at least one concentration measurement sensor 34 at the at least one measurement point 35 and/or measurement section 35, a concentration of the at least one contained chemical substance and/or of the at least one process chemical added is manipulated, with regard to a specifiable target value for the concentration of the at least one chemical substance contained in the treatment liquid and/or of the at least one process chemical added and/or of the at least one internal standard added, by apportioning at least one process chemical and/or the at least one process chemical added at at least one dosing point 33 by means of at least one dosing means 32.

In the exemplary embodiment of a pasteurizing device 1 represented in FIG. 1, concentration measurement sensors 34 are represented at multiple measurement points 35 and/or measurement sections 35 to that end, by means of which concentration measurement sensors 34 an actual value of a concentration of one or multiple process chemicals can respectively be detected. Quite generally, it may also be expedient here to detect an actual value of the concentration of a specific chemical substance contained and/or dissolved in the treatment liquid 5, and/or of a specific process chemical added and/or of a specific internal standard added by means of one respective concentration measurement sensor 34 also at multiple measurement points 35. Examples of suitable and/or preferred solutions for the detection of concentrations will be explained below.

In the exemplary embodiment of a pasteurizing device 1 represented in FIG. 1, dosing means 32 arranged at multiple dosing points 33 are further represented. A dosing means 32 can preferably be configured, as is generally known, for apportioning a concentrated, aqueous solution of one or multiple process chemical(s), with known concentration of the process chemical(s). To that end, a dosing means 32 can comprise a dosing valve, for example. Alternatively, also an apportioning of solid or gaseous process chemicals is generally possible, of course.

In the exemplary embodiment represented in FIG. 1, a dosing means 32 can generally be provided for apportioning only one process chemical. Yet it may evidently also be provided that multiple process chemicals are apportioned to the aqueous treatment liquid by means of one dosing means 32. Here, advantages may arise for different process chemicals depending on a respectively selected dosing point 33, for example, as will be explained in more detail below.

An addition of an internal standard of known concentration and/or quantity to the treatment liquid can generally be done separately from the addition of the process chemical(s). Preferably, however, an internal standard is admixed to the treatment liquid together with at least one process chemical, and in particular together with one or multiple process chemical(s) whose concentration is to be inferred on the basis of the detection of the concentration of the internal standard. In particular, a process chemical and an internal standard can therefore be apportioned to the treatment liquid together by means of one or multiple dosing means 32. Such an added internal standard enables, in particular, a loss in process chemical(s), for example due to the sprinkling of the containers and/or due to evaporation of the treatment liquid, as elaborated above, to be acquired in particular in a pasteurizing zone and by replacement with fresh treatment liquid.

A colorant, in particular a fluorescent dye, for example, can be apportioned as internal standard. Reference is made to fluorescein, a rhodamine or preferably 1,3,6,8-Pyrenetetrasulfonic acid, sodium salt (PTSA) as suitable internal standards. A detection of an actual value of the concentration of an internal standard can then be done by measuring a fluorescence, for example, in case of a respective fluorescence wavelength of the internal standard, and concentration measurement sensors 34 configured as fluorescence measurement sensors 36, for example, can be arranged in the pasteurizing device 1 to that end. A detection of the concentration of an internal standard, for example by means of such fluorescence measurement sensors 36, can be done, in this case, preferably at multiple measurement points 35, as this is also illustrated in FIG. 1.

Generally, the apportioning of all process chemicals added can be done on the basis of one or multiple detected actual value(s) of the concentration of an internal standard by specifying one or multiple respective target value(s). However, as this enables a loss in process chemicals to be acquired only due to a loss of the treatment liquid as such, as has been elaborated above, a higher apportioning of the process chemical(s) than results purely by calculation from a detected actual value of the concentration of an internal standard can be carried out in this case. Furthermore, a direct detection of an actual value of the concentration may be advantageous, at least for some process chemicals. As equally described, this applies in particular to process chemicals whose concentration continuously decreases on the basis of chemical reactions in the treatment liquid 5, in particular on the basis of reactions with microorganisms or substances contained and/or dissolved in the treatment liquid.

Quite generally, a specification, on the basis of one or multiple actual value(s), of one or multiple target value(s) for a concentration of the at least one chemical substance contained in the treatment liquid and/or of the at least one process chemical added and/or of the at least one internal standard added can, of course, be done in a variable manner. Furthermore, it is also absolutely possible to specify different target values for the concentration of the at least one chemical substance contained in the treatment liquid and/or of the at least one process chemical added and/or of the at least one internal standard added for different measurement points 35 and/or measurement sections 35.

Furthermore, as represented in FIG. 1, at least one process chemical can, quite generally, be apportioned by means of at least one dosing means 32 at at least one dosing point 33 arranged in the circulation circuit 23 or in a treatment zone 3. It may also be useful, in particular depending on the type of a process chemical, if at least one process chemical is apportioned to the treatment liquid by means of a dosing means 32 at at least one dosing point 33 arranged in a feed pipe 37 for fresh treatment liquid. Examples of preferred dosing points 33 for specific process chemicals will be explained in more detail below on the basis of the exemplary embodiment in accordance with FIG. 1.

As is further represented in FIG. 1, it may be provided in the method that at least one actual value of the concentration of at least one contained chemical substance and/or of at least one process chemical added and/or of at least one internal standard added is detected by at least one concentration measurement sensor 34 at at least one measurement point 35 arranged in the circulation circuit 23 or in a treatment zone 3. Equally, it is also possible here, of course, to detect a respective actual value by means of at least one concentration measurement sensor 34 at at least one measurement point 35 arranged in the feed pipe 37. This may be the case in particular with regard to a detection of an actual value of a concentration of a chemical substance contained and/or dissolved in the fresh treatment liquid and/or in a fresh water.

An execution of the method may also be expedient in which a first actual value and a second actual value of the concentration of at least one contained chemical substance and/or of at least one process chemical added and/or of at least one internal standard added is detected in the treatment liquid by means of a first concentration measurement sensor 34 and by means of a second concentration measurement sensor 34 at at least two measurement points 35 spaced apart from one another, as this is schematically apparent from FIG. 1. Subsequently, on the basis of the actual value detected by means of the first concentration measurement sensor 34 and/or on the basis of the actual value detected by means of the second concentration measurement sensor 34, a concentration of the at least one contained chemical substance and/or of the at least one process chemical added can be manipulated, with regard to a specifiable target value for the concentration of the at least one chemical substance contained in the treatment liquid and/or of the at least one process chemical added and/or of the at least one internal standard added. In this context, it may be of advantage, for example, if the first actual value is detected by means of a first concentration measurement sensor 34 arranged adjacent to a dosing means 32 upstream in relation to a flow direction of the treatment liquid, and the second actual value is detected by means of a second concentration measurement sensor 34 arranged spaced at least 5 meters apart from the first concentration measurement sensor 34 upstream in relation to a flow direction of the treatment liquid.

With regard to the measurement of a concentration by means of a concentration measurement sensor as well as the apportioning of process chemicals by means of dosing means, advantages may arise as a result of certain, specific executions of the method, which advantages will be described in more detail below on the basis of exemplary embodiments.

For example, it may be of advantage that the biocide, in particular chlorine dioxide, is apportioned to a volume flow of the treatment liquid 5, which volume flow of the treatment liquid 5 is run in a circulation circuit pipe 24 leading, in terms of flow dynamics, to a cool-down zone 14, such as this is also represented in FIG. 1. As is equally represented in FIG. 1, the biocide can be apportioned to the treatment liquid 5, quite generally, at at least one dosing point 33 arranged in the circulation circuit 23 or in a treatment zone 3, at which dosing point 33 treatment liquid 5 is run at a temperature of 20° C. to 55° C. In this case, in the exemplary embodiment represented in FIG. 1, a biocide, in particular chlorine dioxide, can be apportioned by means of the dosing means 32, 38 represented. These measures are useful in particular because the conditions in such areas of a pasteurizing device 1 particularly facilitate a formation of biofilms due to a high reproduction of microorganisms. Preferably, biocide can be apportioned to the treatment liquid by means of at least one dosing means 32, 38 at at least one dosing point 33 and/or at at least one dosing section 33, at which dosing point 33 or at which dosing section 33 treatment liquid 5 is run at a temperature of 30° C. to 45° C.

In addition, as equally represented in FIG. 1, the biocide can be apportioned to the treatment liquid 5 at at least one dosing point 33 arranged in the at least one bypass 28 downstream, in terms of flow dynamics, of a membrane filtration means 29, such as this is illustrated on the basis of the respectively-positioned dosing means 32, 38 represented in FIG. 1.

As is apparent from FIG. 1, at least one actual value of the biocide concentration in the treatment liquid 5 can, quite generally, be detected by means of at least one biocide concentration measurement sensor 34, 39 at at least one measurement point 35, and, on the basis of the actual value detected at the at least one measurement point 35, a concentration of the biocide in the treatment liquid 5 can be manipulated, with regard to a specifiable target value for the concentration of the biocide, by apportioning the biocide by means of at least one dosing means 32, 38 at at least one dosing point 33. At least one actual value of the biocide concentration can be detected here at at least one measurement point 35 arranged in the circulation circuit 23 or in a treatment zone 3, at which measurement point 35 treatment liquid 5 is run at a temperature of 20° C. to 55° C., such as this is illustrated on the basis of the respectively-positioned concentration measurement sensors 34, 39. Quite generally, it may be of advantage if multiple actual values of a biocide concentration in the treatment liquid 5 are detected by means of multiple biocide concentration measurement sensors 34, 39 at multiple measurement points 35 of a pasteurizing device 1, for example in the circulation circuit 23 and/or its circulation circuit pipes 24 and/or treatment zone(s) 3, such as this is equally represented in FIG. 1. Preferably, it may be provided that at least one actual value of the biocide concentration is detected by means of at least one concentration sensor 34, 39 at at least one measurement point 35 and/or at at least one measurement section 35, at which measurement point 35 and/or at which measurement section 35 treatment liquid 5 is run at a temperature of 30° C. to 45° C.

In case of an apportioning of chlorine dioxide as biocide, at least one actual value of a chlorine dioxide concentration can be detected by means of a concentration measurement sensor 34 configured for determining chlorine dioxide at at least one measurement point 35 and/or measurement section 35. Concentration measurement sensors 34 for measuring a chlorine dioxide concentration are generally known. Generally, a chlorine dioxide concentration can be detected by means of different measurement methods and/or measurement principles. For example, amperometric, fluorometric or optical sensors 34 measuring a light absorption can be used. In case of an apportioning of another biocide than chlorine dioxide, another can accordingly be used for measuring the concentration of such other biocide, of course.

Preferably, when chlorine dioxide is used as biocide, a dosing means 32, 38 or the dosing means 32, 38, can be connected with a provisioning means 40 for chlorine dioxide, as is represented in the exemplary embodiment in accordance with FIG. 1. Such a provisioning means 40 can be configured for the chemical production and provisioning of chlorine dioxide for the dosing means 32, 38, so that, during operation of the pasteurizing device 1, chlorine dioxide can be chemically produced in situ and provisioned for the dosing means 32, 38 by means of the provisioning means 40. Here, a provisioning means 40 can be configured for the chemical production of chlorine dioxide according to a method generally known, such as the hydrochloric acid/chlorite method or the persulfate/chlorite method and/or the peroxosulfate/chlorite method. Preferably, the provisioning means 40 can be configured for producing chlorine dioxide according to the so-called one-component solid method.

A target value of a biocide concentration, in particular chlorine dioxide concentration, can definitely be specified in a varied and/or variable manner as and when required, for example depending on the contaminant concentration and/or depending, for example, on a detected microbial count in the treatment liquid.

In the method for operating a pasteurizing device 1, it may further be provided that a pH-regulating agent comprising at least one acid selected from a group consisting of phosphoric acid, formic acid, acetic acid, citric acid, gluconic acid, lactic acid, heptagluconic acid, or a mixture of acids selected from this group, is apportioned to the treatment liquid 5. The pH value of the treatment liquid has a large impact on other properties of the treatment liquid, and in particular on undesired side effects caused by the treatment liquid. In the case of the treatment of containers comprising a metal, in particular containers comprising aluminum and/or aluminum cans, the pH value of the treatment liquid per se, for one thing, has proven an important parameter for impeding discolorations on the containers. Furthermore, it turned out that also the choice of the acid(s) used for pH regulation is important with regard to impeding discolorations on the containers, in particular the formation of the so-called staining.

It may in particular be provided in the method that the pH-regulating agent is apportioned to the treatment liquid 5 at at least one dosing point 33, at which dosing point 33 treatment liquid 5 is run at a temperature of 40° C. to 90° C., such as this is represented in FIG. 1 on the basis of the dosing means 32, 41.

Furthermore, at least one actual value of a pH value of the treatment liquid can be detected by means of at least one pH measurement sensor 34, 42 at at least one measurement point 35. Subsequently, a pH-regulating agent can then be apportioned on the basis of a detected actual value of a pH value of the treatment liquid 5. As is illustrated in the FIG. 1, the at least one actual value of a pH value of the treatment liquid 5 can be detected at at least one measurement point 35, at which measurement point 35 treatment liquid is run at a temperature of 40° C. to 90° C.

Furthermore, it may be expedient to apportion at least one complex-forming acid selected from a group consisting of gluconic acid, lactic acid, citric acid, or a mixture of acids selected from this group, to the treatment liquid as process chemical(s) in the method for operating a pasteurizing device 1. This is done in such a way that a concentration of the at least one complex-forming acid, or a total concentration of the apportioned, complex-forming acids, does not exceed 2.2 mmol/L.

It may be of advantage in this context if the at least one complex-forming acid is apportioned to the treatment liquid 5 at at least one dosing point 33, at which dosing point 33 treatment liquid 5 is run at a temperature of 55° C. to 95° C., such as this is also shown in the exemplary embodiment in accordance with FIG. 1 on the basis of a respectively-positioned dosing means 32, 43. The above-mentioned acids are generally effective as corrosion protection agents and scale prevention agents.

Additionally, it may be useful in an embodiment of the method if at least one complex-forming phosphonic acid selected from a group consisting of (1-Hydroxy-1,1-ethanediyl)bis(phosphonic acid), 3-Carboxy-3-phosphonohexanedioic acid, Diethylenetriamine pentamethylene phosphonic acid, Aminotris(methylenephosphonic acid), or at least one phosphonate of a phosphonic acid selected from this group, or a mixture of phosphonic acids and/or phosphonates selected from this group, is apportioned to the treatment liquid as process chemical(s). This is done in such a way that a concentration of the at least one complex-forming phosphonic acid or of the at least one phosphonate, or a total concentration of the apportioned, complex-forming phosphonic acids and/or phosphonates, does not exceed 0.2 mmol/L. The at least one complex-forming phosphonic acid and/or the at least one complex-forming phosphonate can be apportioned to the treatment liquid 5 at at least one dosing point 33, at which dosing point 33 treatment liquid 5 is run at a temperature of 55° C. to 95° C., such as this is illustrated on the basis of the respectively-positioned dosing means 32, 43 represented in FIG. 1. Accordingly, the dosing means 32, 43 can be provided in the exemplary embodiment represented in FIG. 1 for apportioning both a complex-forming acid and a phosphonate. Also the above-mentioned phosphonates are effective with regard to scale prevention and also corrosion protection.

Yet it may also be provided that a divalent zinc salt is apportioned to the treatment liquid as process chemical, namely such that a concentration of the divalent zinc salt does not exceed 0.06 mmol/L.

Also $Zn^{2+}$ salts have proven effective primarily as corrosion inhibitors and can generally be apportioned to the treatment liquid together with other process chemicals and/or corrosion inhibitors. An apportioning of a divalent zinc salt can be done, again, by means of the dosing means designated with 32, 43 in FIG. 1. Yet, quite generally, also another and/or additional dosing means can be provided to that end.

Furthermore, it may be provided that an oligomer or polymer substance selected from a group consisting of polyphosphates, water-soluble polyacrylates and copolymers of maleic acid and acrylic acid, or a mixture of oligomer or polymer substances selected from this group, is apportioned to the treatment liquid as process chemical, such that a concentration of the apportioned oligomer or polymer substance, or a total concentration of the apportioned oligomer or polymer substances, does not exceed 0.4 g/L.

These oligomer or polymer substances have proven equally effective in particular with regard to an impeding of scale formation. The respective oligomers and/or polymers can have molecular weights in the range from 4000 g/mol to 15000 g/mol, for example. Again, an apportioning of an oligomer and/or polymer substance, in the exemplary embodiment represented in FIG. 1, can be done by means of the dosing means 32, 43, or one or multiple additional dosing means.

In addition, it may be of advantage in the method if a phosphoric ester, or a mixture of phosphoric esters, is apportioned to the treatment liquid as process chemical, such that a concentration of the phosphoric ester, or a total concentration of the phosphoric esters, does not exceed 0.1 g/L.

Phosphoric esters, per se or also in combination with other process chemicals, have, again, proven to be effective corrosion inhibitors. Also one or multiple phosphoric esters can generally be apportioned using one dosing means 32, 43, such as this is illustrated on the basis of the exemplary embodiment represented in FIG. 1.

In particular in the context of scale prevention, it may furthermore be expedient in the method if an actual value of a water hardness of the treatment liquid is detected by means of at least one $Ca^{2+}$ and/or $Mg^{2+}$ measurement sensor 34, 44 at at least one measurement point 35. Here, sensors for detecting a $Ca^{2+}$ and/or $Mg^{2+}$ concentration may in particular comprise ion-selective electrodes. In particular, an actual value of a water hardness of the treatment liquid can be detected, by means of at least one $Ca^{2+}$ and/or $Mg^{2+}$ measurement sensor 34, 44, at at least one measurement point 35 arranged in a feed pipe 37 for fresh treatment liquid, such as this is illustrated in FIG. 1. Subsequently, an apportioning of the above-mentioned process chemicals which are effective with regard to scale prevention and/or prevention of scale formation can be carried out on the basis of a measured actual value of the water hardness.

Furthermore, it may be provided that an actual value of a conductivity of supplied, fresh treatment liquid is detected at at least one measurement point 35 arranged in a feed pipe 37 for fresh treatment liquid.

Generally, the conductivity of the fresh treatment liquid can be detected manually by sample-taking at the measurement point and subsequent laboratory measurement. Preferably, it may be provided that the conductivity is detected by means of a concentration measurement sensor 34 formed by a conductivity sensor 45, such as this can also be seen from FIG. 1. Here, the detection of the conductivity of the fresh treatment liquid is representative of the total concentration of dissolved ions in the freshly supplied treatment liquid.

The detection of the conductivity, therefore, provisions an actual value of dissolved, ionic substances contained in the supplied, fresh treatment liquid which may be relevant with regard to the formation of deposits or also discolorations in the course of the treatment with treatment liquid. On the basis of such a detected actual value of the conductivity of the supplied, fresh treatment liquid, a specification of target values for the concentration of process chemicals in the treatment liquid 5 can then be done. For example, it may be provided that a target value or target values of the conductivity for the process chemical(s) is increased upon detection of an increased and/or high actual value. Upon detection of a decreased and/or low actual value of the conductivity, the opposite can be done. It may then respectively and/or subsequently be provided that a dosage quantity of at least one process chemical is increased and/or decreased. In other words, a target value for the concentration of one or multiple process chemical(s) can be specified, at least in part or for the most part, on the basis of the detected conductivity of the supplied, fresh treatment liquid. Respectively, a dosage quantity of at least one process chemical can be adjusted with regard to a specifiable target value for a concentration of one or multiple chemical substance(s) contained in the treatment liquid, in particular $Ca^{2+}$ and $Mg^{2+}$ ions.

As is illustrated on the basis of the exemplary embodiment in accordance with FIG. 1, it may also be provided in the method, in terms of safety technology, that, upon a detected exceeding of a specified target value of the concentration of an apportioned process chemical, in particular an apportioned biocide, gas atmosphere is exhausted from the treatment zones 3 by means of an exhaust means 46 operatively connected with the treatment zones 3.

As equally represented in FIG. 1, a control means 47 may be provided for the automatic control of the apportioning of the process chemical(s), as is generally known. As illustrated, such a control means 47 can be connected, in terms of signal engineering, in particular to the concentration measurement sensors 34 and dosing means 32 represented by way of example, but also to other and/or additional components of the pasteurizing device 1.

The invention claimed is:

1. A method for operating a pasteurizing device for pasteurizing foods filled into sealed containers, comprising:
   transporting sealed containers which are filled with foods through multiple treatment zones in a transport direction by means of a transport means, the treatment zones including at least one warm-up zone, at least one pasteurizing zone following the at least one warm-up zone in the transport direction, and at least one cool-down zone following the pasteurizing zone in the transport direction,
   treating the foods in the treatment zones by applying a tempered, aqueous treatment liquid to an exterior of the containers, wherein treatment liquid with a specific temperature is supplied to each treatment zone via a feed pipe, such that the foods are pre-heated in the at least one warm-up zone, heated to a pasteurizing temperature in the at least one pasteurizing zone, and cooled down, in the at least one cool-down zone,
   and wherein:
   the treatment liquid is collected in the treatment zones after application to the containers, and collected treatment liquid is re-supplied to at least one treatment zone for reuse via circulation circuit pipes of a circulation circuit,
   a partial quantity of treatment liquid is continuously removed from the treatment liquid circulated in the circulation circuit or from the treatment liquid in a treatment zone by means of at least one liquid-removal means for forming at least one partial flow of the treatment liquid, which at least one partial flow is supplied, via a feeding pipe of at least one bypass, to a membrane filtration means arranged in the at least one bypass and filtered, and subsequently fed back again into the circulation circuit or into one or more of the treatment, zones,
   process chemicals are added to the treatment liquid,
   a biocide, selected from a group consisting of hypochlorite, peracetic acid, chlorine dioxide and bronopol, and mixtures thereof, is apportioned to the treatment liquid as process chemical, such that a concentration of the biocide does not exceed 0.4 mmol/L, and
   a pH-regulating agent comprising at least one inorganic or organic acid is apportioned to the treatment liquid as process chemical, such that a pH value of the treatment liquid is set to a range from 3.5 to 7.0.

2. The method according to claim 1, wherein the chlorine dioxide is apportioned to the treatment liquid as the biocide.

3. The method according to claim 1, wherein the biocide is apportioned to a volume flow of the treatment liquid, which volume flow of the treatment liquid is run in a circulation circuit pipe leading, in terms of flow dynamics, to a cool-down zone.

4. The method according to claim 1, wherein the biocide is apportioned to the treatment liquid at at least one dosing point arranged in the circulation circuit or in one or more of the treatment zones, at which dosing point treatment liquid is run at a temperature of 20° C. to 55° C.

5. The method according to claim 1, wherein the biocide is apportioned to the treatment liquid at at least one dosing point arranged in the at least one bypass downstream, in terms of flow dynamics, of the membrane filtration means.

6. The method according to claim 1, wherein at least one actual value of the biocide concentration in the treatment liquid is detected by means of at least one biocide concentration measurement sensor at at least one measurement point, and, based on the actual value detected at the at least one measurement point, the concentration of the biocide in the treatment liquid is manipulated with regard to a specifiable target value for the concentration of the biocide, by apportioning the biocide by means of at least one dosing means at at least one dosing point.

7. The method according to claim 6, wherein at least one actual value of the biocide concentration is detected at at least one measurement point arranged in the circulation circuit or in a treatment zone, at which measurement point treatment liquid is run at a temperature of 20° C. to 55° C.

8. The method according to claim 1, wherein the pH-regulating agent is selected from a group consisting of sulphuric acid, phosphoric acid, formic acid, acetic acid, citric acid, gluconic acid, lactic acid, heptagluconic acid, and mixtures thereof.

9. The method according to claim 1, wherein the pH-regulating agent is apportioned to the treatment liquid at at least one dosing point, at which dosing point treatment liquid is run at a temperature of 40° C. to 90° C.

10. The method according to claim 1, wherein at least one complex-forming acid selected from a group consisting of gluconic acid, lactic acid, citric acid, and mixtures thereof, is apportioned to the treatment liquid as process chemical(s), such that a concentration of the at least one complex-forming acid does not exceed 2.2 mmol/L.

11. The method according to claim 10, wherein the at least one complex-forming acid is apportioned to the treatment liquid at at least one dosing point, at which dosing point treatment liquid is run at a temperature of 55° C. to 95° C.

12. The method according to claim 1, wherein a complex-forming additive selected from a group consisting of (1-Hydroxy-1,1-ethanediyl)bis(phosphonic acid), 3-Carboxy-3-phosphonohexanedioic acid, Diethylenetriamine pentamethylene phosphonic acid, Aminotris(methylenephosphonic acid), a phosphonate of (1-Hydroxy-1,1-ethanediyl)bis(phosphonic acid), a phosphonate of 3-Carboxy-3-phosphonohexanedioic acid, a phosphonate of Diethylenetriamine pentamethylene phosphonic acid, a phosphonate of Aminotris(methylenephosphonic acid), and mixtures thereof, is apportioned to the treatment liquid as process chemical(s), such that a concentration of the complex-forming phosphonic additive does not exceed 0.2 mmol/L.

13. The method according to claim 12, wherein the complex-forming additive is apportioned to the treatment liquid at at least one dosing point, at which dosing point treatment liquid is run at a temperature of 55° C. to 95° C.

14. The method according to claim 1, wherein a divalent zinc salt is apportioned to the treatment liquid as process chemical, such that a concentration of the divalent zinc salt does not exceed 0.06 mmol/L.

15. The method according to claim 1, wherein an oligomer or polymer substance selected from a group consisting of polyphosphates, water-soluble polyacrylates and copolymers of maleic acid and acrylic acid, and mixtures thereof, is apportioned to the treatment liquid as process chemical, such that a concentration of the oligomer or polymer substance does not exceed 0.4 g/L.

16. The method according to claim 1, wherein one or more phosphoric esters, is apportioned to the treatment liquid as process chemical, such that a concentration of the phosphoric esters does not exceed 0.1 g/L.

17. The method according to claim 1, wherein at least one actual value of a concentration of at least one chemical substance contained in the treatment liquid and/or of at least one process chemical added and/or of at least one internal standard added is detected by means of at least one concentration measurement sensor at at least one measurement point, and, based on the actual value detected by means of the at least one concentration measurement sensor at the at least one measurement point, the concentration of the at least one chemical substance contained in the treatment liquid and/or of the at least one process chemical added is manipulated with regard to a specifiable target value for the concentration of the at least one chemical substance contained in the treatment liquid and/or of the at least one process chemical added and/or of the at least one internal standard added, by apportioning the at least one process chemical added and/or the at least one process chemical added at at least one dosing point by means of at least one dosing means.

18. The method according to claim 17, wherein at least one actual value of a pH value of the treatment liquid is detected by means of at least one pH measurement sensor at at least one pH measurement point.

19. The method according to claim 18, wherein at the pH measurement point treatment liquid is run at a temperature of 40° C. to 90° C.

20. The method according to claim 17, wherein an actual value of a water hardness of the treatment liquid is detected by means of at least one $Ca^{2+}$ and/or $Mg^{2+}$ measurement sensor at one or more water hardness measurement points.

21. The method according to claim 20, wherein at least one of the water hardness measurement points is arranged in a feed pipe for fresh treatment liquid.

22. The method according to claim 1, wherein an actual value of a conductivity of supplied, fresh treatment liquid is detected at at least one measurement point arranged in a feed pipe for fresh treatment liquid.

* * * * *